United States Patent [19]
Iwai et al.

[11] Patent Number: 5,491,529
[45] Date of Patent: Feb. 13, 1996

[54] CAMERA WITH INFRARED BEAM TYPE REMOTE CONTROLLER

[75] Inventors: Fumio Iwai; Katsuji Ozawa; Michihiro Shiina, all of Omiya, Japan

[73] Assignee: Fuji Photo Optical Co., Ltd., Saitama, Japan

[21] Appl. No.: 132,860

[22] Filed: Oct. 7, 1993

[30] Foreign Application Priority Data

Oct. 16, 1992 [JP] Japan ................... 4-304750

[51] Int. Cl.⁶ .................................................. G03B 17/38
[52] U.S. Cl. .......................... 354/266; 354/403; 356/4.01
[58] Field of Search ........................ 354/400, 402, 354/403, 404, 162, 163, 266, 195.1; 356/3, 4

[56] References Cited

U.S. PATENT DOCUMENTS 4,408,288  10/1983  Kondo et al. .................. 356/4 X
4,601,557  7/1986   Bogle et al. ................... 354/400 X
4,998,125  4/1991   Watanabe et al. .............. 354/403

*Primary Examiner*—Howard B. Blankenship

[57] ABSTRACT

A camera according to the present invention prevents distance measurement errors in remote control shots under high luminance and those in which the distance of a background between right and left objects is measured, by projecting a remote control signal including a ranging signal in a form of infrared beam from a transmitter. The ranging signal, within the remote control signal, includes multiple pulses with different pulse widths, and each pulse width is set so that the number of pulses received by the receiving circuit becomes fewer accordingly as the distance between the transmitter and a receiver provided in the camera becomes larger. When the receiver receives a ranging signal from the transmitter, a distance recognizing unit counts a pulse number of the ranging signal received by the receiver, and recognizes the distance to the transmitter, namely the object, from the relationship of received pulse numbers and distance stored in a memory unit.

21 Claims, 7 Drawing Sheets

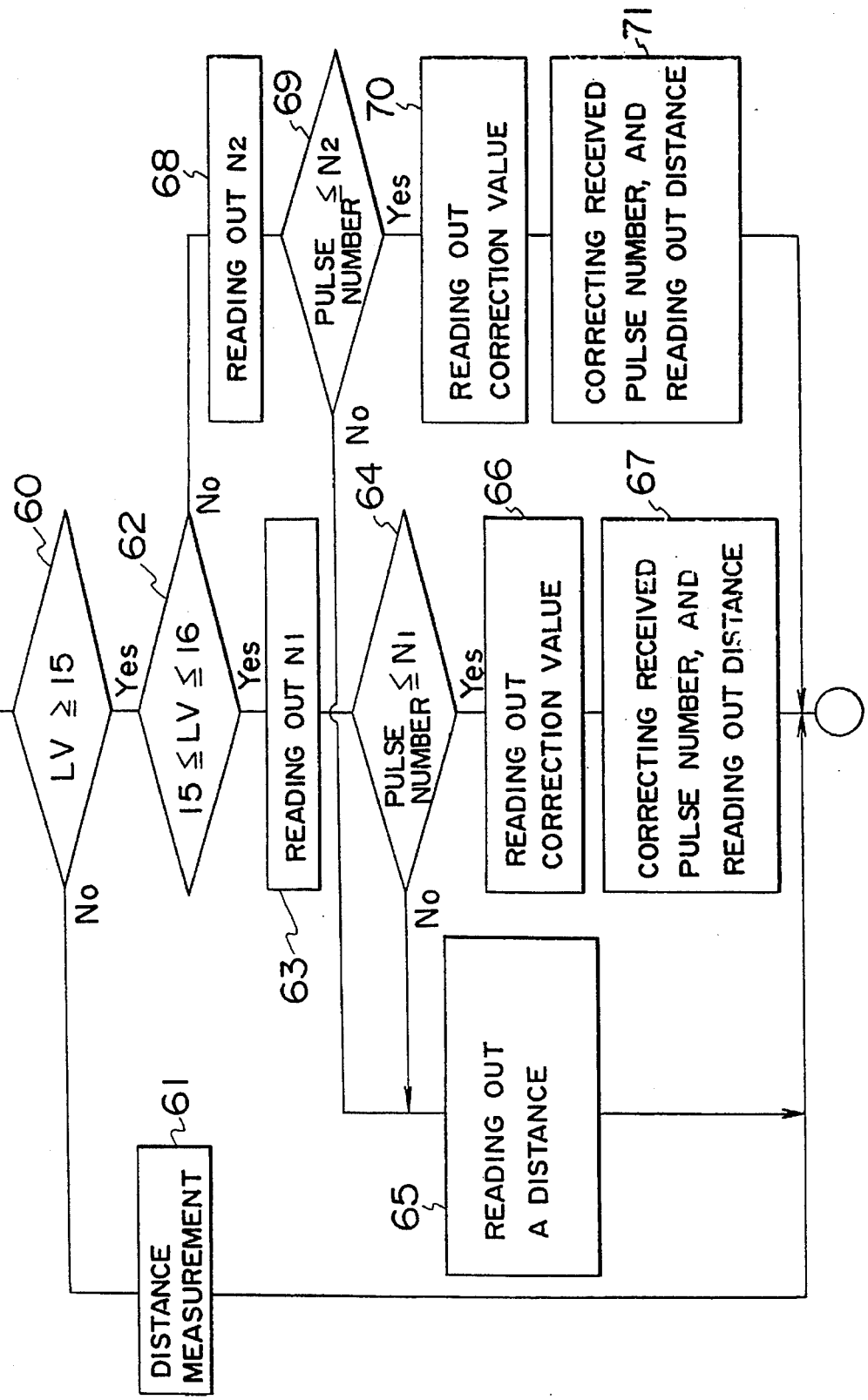

5,491,529

CAMERA WITH INFRARED BEAM TYPE REMOTE CONTROLLER

BACKGROUND OF THE INVENTION

The present invention relates to a camera with infrared beam type remote controller.

In case of a conventional cameras with infrared beam type remote controller, a release signal is projected in a form of infrared beam from a transmitter, a reception circuit which is provided in the camera receives the projected infrared beam, and a shutter is released. The transmitter only projects the release signal with infrared beam, and the camera only releases the shutter by receiving the infrared beam.

Because of this, in the case of cameras like this, it is not possible to get pictures as desired because of distance measurement errors in remote control shots under high luminance where an auto focusing function of the camera does not work satisfactorily or in remote control shots where the auto focusing function measures the distance of a background between right and left objects.

SUMMARY OF THE INVENTION

It is an object, therefore, of the present invention to overcome the disadvantage and limitation of the prior art by a new and improved camera with infrared beam type remote controller.

Another object of the present invention is to provide a camera with infrared beam type remote controller which can prevent distance measurement errors in remote control shots under high luminance where the auto focusing function of the camera does not work satisfactorily or in remote control shots where the auto focusing function measures the distance of a background between right and left objects.

The above and other objects are attained by a camera with infrared beam type remote controller for performing a remote control shot comprising; transmitting means, responsive to an external operation, for projecting an infrared ranging remote control signal including a signal which is composed of a sequence of pulses with different pulse widths; receiving means for receiving said ranging signal from said transmitting means; said ranging signal having pulse widths set so that the number of pulses received by said receiving means becomes fewer accordingly as the distance between said transmitting means and said receiving means becomes larger; memory means for storing the relationship of the pulse number of said ranging signal which said receiving means receives and distance; distance recognizing means, responsive to said receiving means and said memory means, for counting the pulse number of that portion of said range signal which said receiving means actually received for reading a distance corresponding to a counted pulse number from said memory means, and for recognizing a distance between said transmitting means and the camera; and focusing means, responsive to said distance recognizing means, for bringing out a taking lens to a lens position corresponding to the distance recognized by said distance recognizing means.

Also, the above and other objects are attained by a camera with infrared beam type remote controller for performing a remote control shot comprising; transmitting means, responsive to an external operation, for projecting an infrared remote control signal including a ranging signal which is composed of a sequence of pulses with different pulse widths; receiving means for receiving said ranging signal from said transmitting means; said ranging signal having pulse widths set so that the number of pulses received by said receiving means becomes fewer accordingly as the distance between said transmitting means and said receiving means becomes larger; memory means for storing the relationship of the pulse number of said distance information ranging signal which said receiving means receives and distance; an electrically rewritable non-volatile memory $E^2PROM$ for storing the numbers of received pulses, representing cases requiring correction, of the ranging signal of said receiving means and correction values for the numbers of received pulses of said ranging signal of said receiving means, the numbers of received pulses, representing cases requiring correction, of the ranging signal of said receiving means and correction values for the numbers of received pulses of said ranging signal of said receiving means being set based on comparison between the numbers of received pulses, for distance under field conditions exceeding a prescribed high luminance, of said ranging signal of said receiving means and pulse numbers for distance of said memory means; counting means, responsive to said receiving means, for counting the pulse number of that portion of said ranging signal which said receiving means actually received; correcting means, responsive to said counting means and said $E^2PROM$, for giving a corrected pulse number by correcting a pulse number counted by said counting means, by means of said correction value, in a case the field exceeds said prescribed high luminance and the number of received pulses of said ranging signal of said receiving means is less than the number of received pulses representing a case requiring correction, and for giving a pulse number counted by said counting means in other cases; distance recognizing means, responsive to said correcting means and said memory means, for recognizing the distance between said transmitting means and the camera by reading a distance corresponding to a pulse number from said correcting means; and focusing means, responsive to said distance recognizing means, for bringing out the taking lens to a lens position corresponding to the distance recognized by said distance recognizing means.

BRIEF DESCRIPTION OF THE DRAWINGS

A distance determination system for use in a camera having a remote control device, the system comprising: a transmitter for transmitting an infrared ranging signal formed of a sequence of pulses of different widths; a receiver for receiving the ranging signal; and a receiver for receiving the ranging signal; and recognition means, responsive to the receiver, for determining actual distance from the transmitter to the receiver as a function of that portion of the ranging signal actually received. Wherein each pulse of the ranging signal after a first pulse changes in size relative to its preceding pulse, the sequence of pulses changing in size by one of progression and regression, and the distance information signal includes a plurality of pulses, each pulse being a substantially different width. The system further comprises: a counter, responsive to the receiver, for counting a pulse number, the pulse number being a number of pulses received from the distance information signal; wherein the recognition means determines actual distance as a function of the pulse number. The system further comprising: a look-up table memory for storing at least one relation between pulse number and actual distance; wherein the recognition means determines actual distance by providing the pulse number to the look-up table memory and receiving therefrom an actual distance according to one of the at least one relation. Also the at least one relation in the look-up table memory including a first relation in which the pulse number is inversely proportional to the actual distance. The system further comprising: an ambient luminance sensor for sensing ambient luminance; a comparator, responsive to the ambient luminance sensor, for comparing the ambient luminance against a reference level; wherein the look-up table memory stores at least a first and second relation between pulse number and actual distance; and the recognition means, also responsive to output from the comparator, determines actual distance as a function of the distance information signal and the comparator output.

The foregoing objects, features and attendant advantages of the present invention will be appreciated as the same become better understood by means of the following description and accompanying drawings wherein;

FIG. 7 is a flow diagram showing a distance measurement processing in FIG. 6.

DETAILED DESCRIPTION OF THE INVENTION

Figure 1:
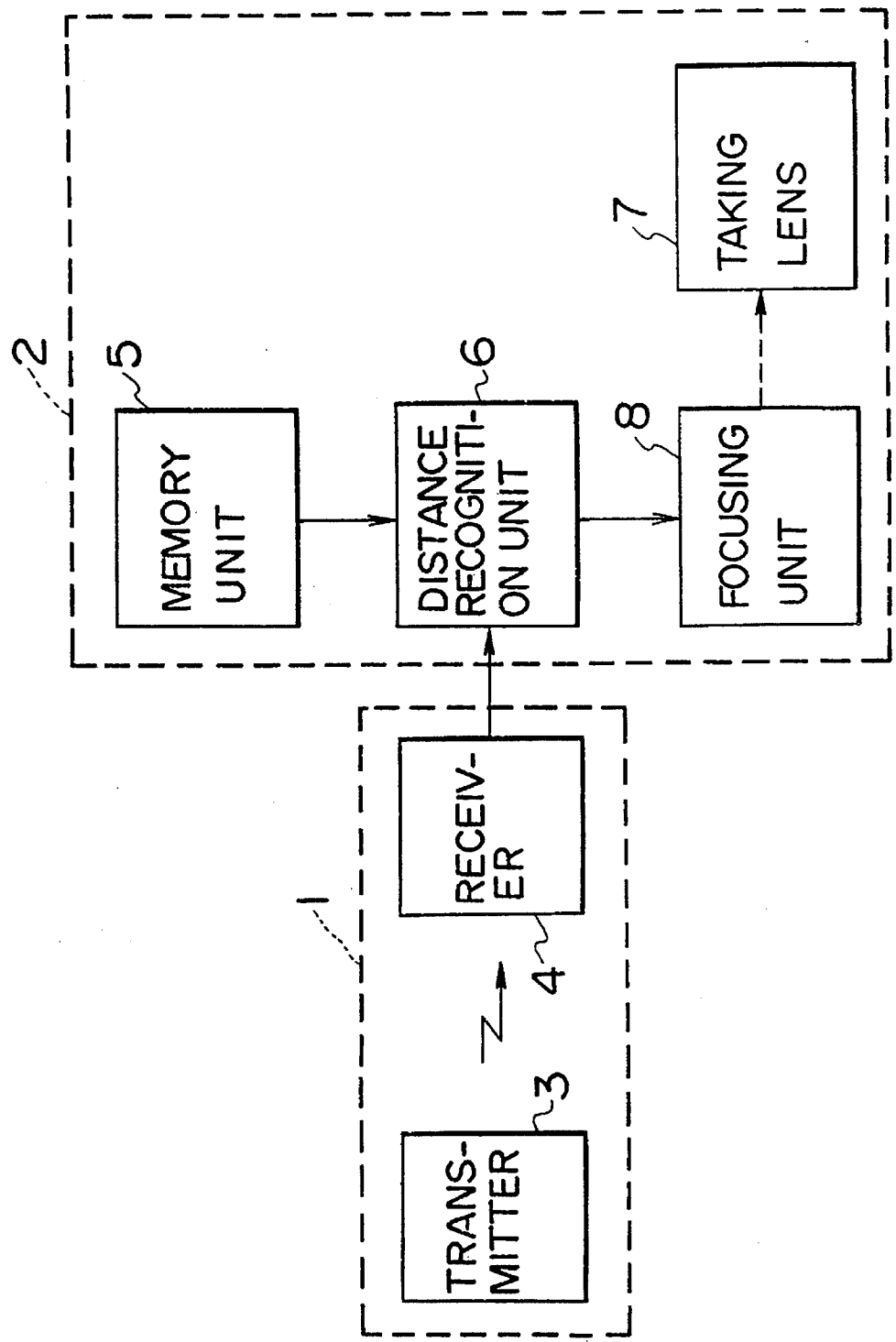
FIG. 1 is a block diagram showing a first fundamental embodiment of a camera with infrared beam type remote controller according to the present invention.

In a first fundamental embodiment of FIG. 1, a reference numeral 1 is an infrared beam type remote controller, and a reference numeral 2 is a camera. The remote controller 1 has a transmitter 3 and a receiver 4 which is provided in the camera 2. The camera 2 has a memory unit 5, a distance recognizing unit 6 and a focusing unit 8. The transmitter 3 of the remote controller 1 projects a remote control signal including a distance a ranging signal, composed of multiple pulses with different pulse widths, with infrared beam. Each pulse width of the ranging signal is set so that the number of pulses received by the receiver 4 becomes fewer accordingly as the distance between transmitter 3 and receiver 4 becomes larger. The memory unit 5 of the camera 2 stores data representing the relationship of distance and the pulse number of the ranging signal received by receiver 4. The distance recognition unit 6 of the camera 2 counts the pulse number of the ranging signal which the receiver 4 receives, reads a distance corresponding to the counted pulse number, and recognizes the distance between transmitter 3 of the remote controller 1 and the camera 2. The focusing unit 8 of the camera 2 brings out a taking lens 7 to a position corresponding to a distance recognized by the distance recognition unit 6. The camera 2 sets the taking lens 7, and then releases a shutter.

Figure 2:
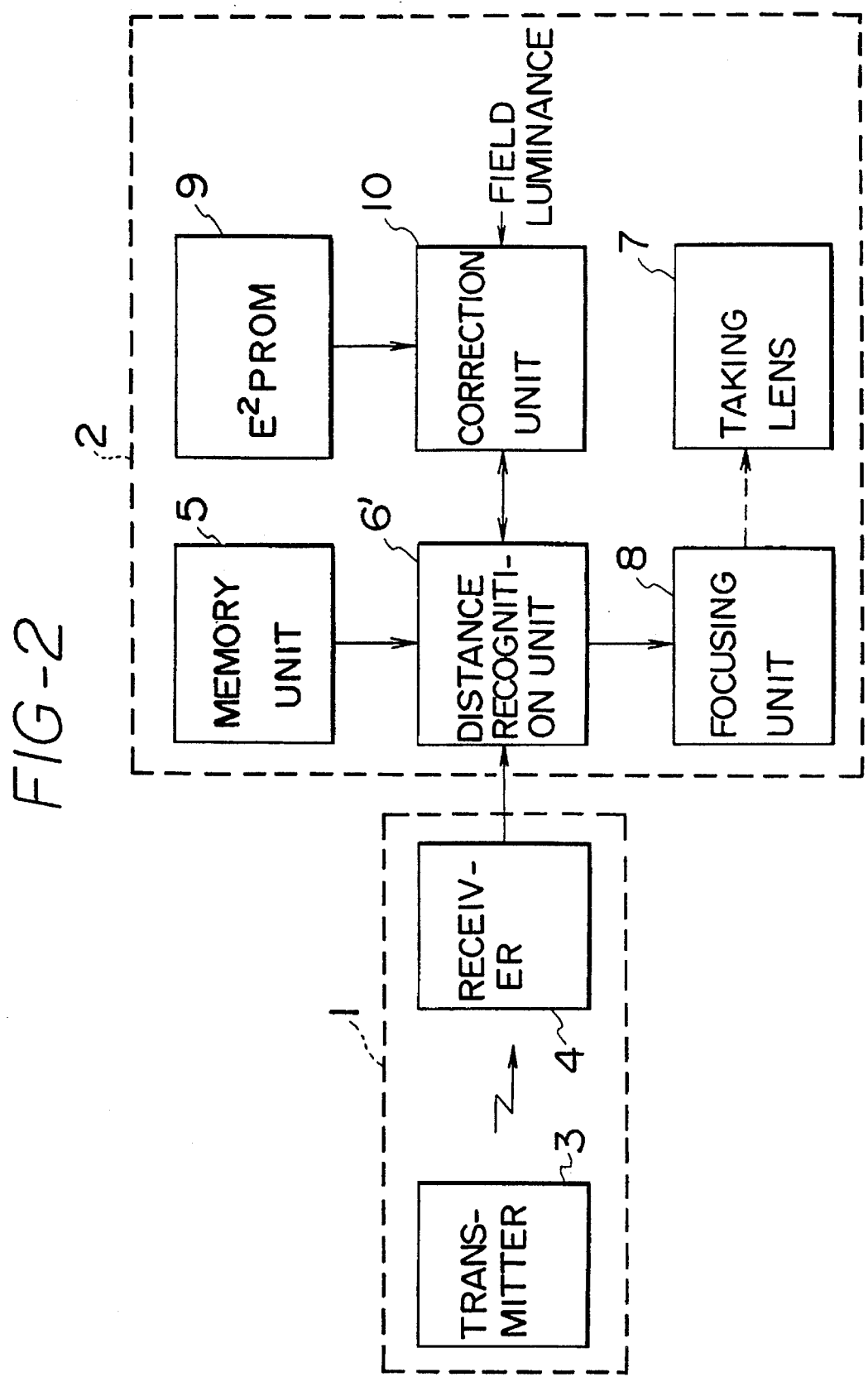
FIG. 2 is a block diagram showing a second fundamental embodiment of the camera with infrared beam type remote controller according to the present invention.

The second fundamental embodiment of FIG. 2 has an electrically rewritable non-volatile memory $E^2PROM$ 9 and a correction unit 10 in addition to the composition of the first fundamental embodiment of FIG. 1. The receiver 4 of the remote controller 1 is influenced by field luminance in the receiving of the ranging signal. That is, when field luminance is high, the receiver 4 is not able to receive pulses with short widths, with certain distance as a border. That is, the number of receivable pulses is less, compared with a case when field luminance is not high. The $E^2PROM$ 9 stores pulse numbers representing cases when the number of receivable pulses is less compared with cases with not high luminance, namely pulse numbers representing cases requiring correction, and correction values representing how many pulses are to be added. The pulse numbers representing cases requiring correction and the correction values representing the number of pulses to be added can be determined by measurement under luminance conditions higher than a prescribed high luminance. The correction unit 10, when field luminance is above the prescribed high luminance and the number of pulses received by the receiver 4 is below a pulse number representing a case requiring correction, corrects the pulse number counted by the distance recognition unit 6' with a correction value, and gives the corrected pulse number to the distance recognition unit 6'. The distance recognition unit 6', when a pulse number of the ranging signal is corrected, reads out a distance corresponding to the corrected pulse number from the memory unit 5, and recognizes the distance between the transmitter 3 of the remote controller 1 and the camera 2. According to the second fundamental embodiment, distance measurement errors are prevented still more in remote control shots under high luminance conditions.

Contents of the foregoing first and second fundamental embodiments will be better understood by means of the undermentioned preferred embodiment.

Figure 3:
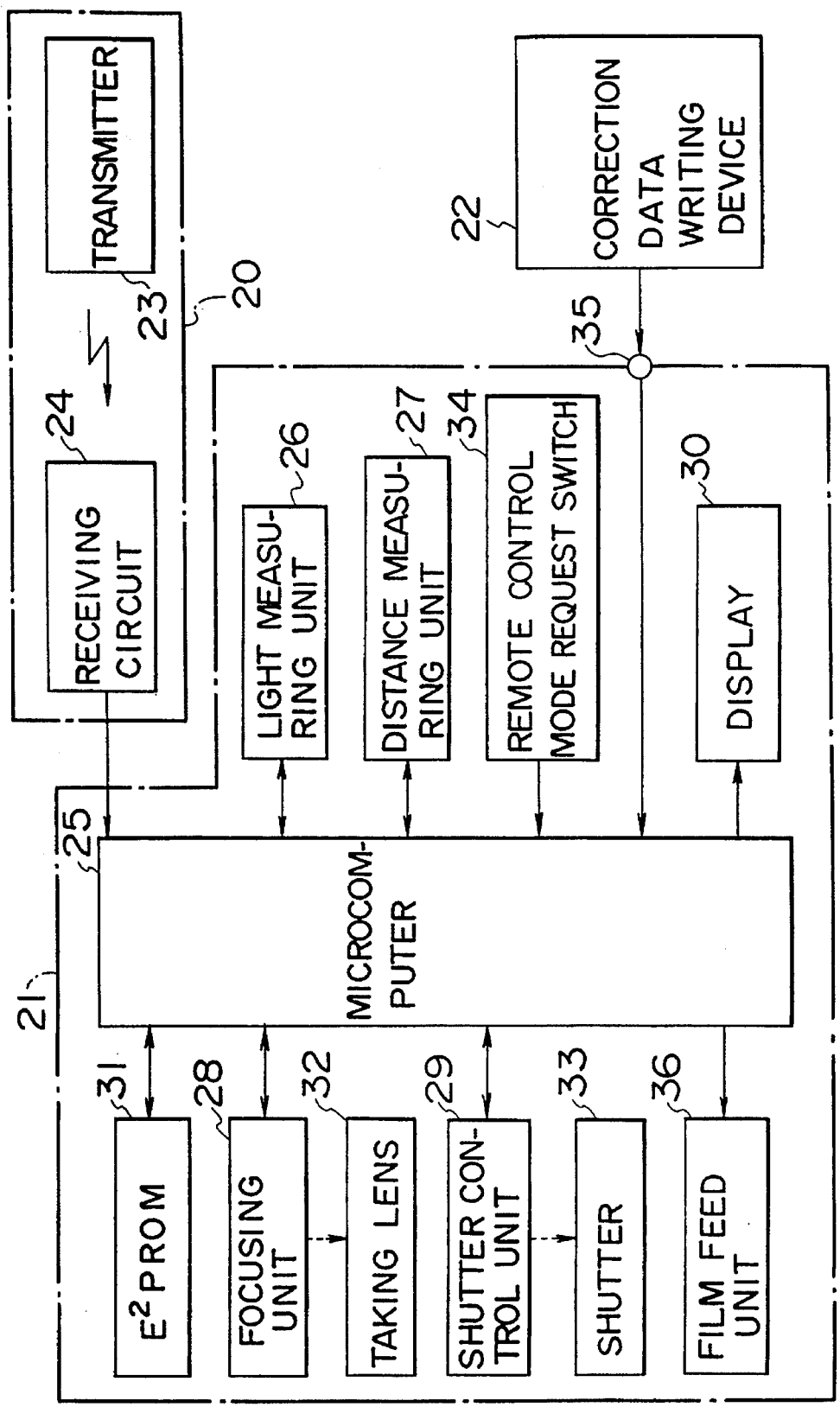
FIG. 3 is a block diagram showing a preferred embodiment of the camera with infrared beam type remote controller according to the present invention.

In a preferred embodiment of FIG. 3, a reference numeral 20 is an infrared beam type remote controller, a reference numeral 21 is a camera, and a reference numeral 22 is a correction data writing device.

Figure 4:
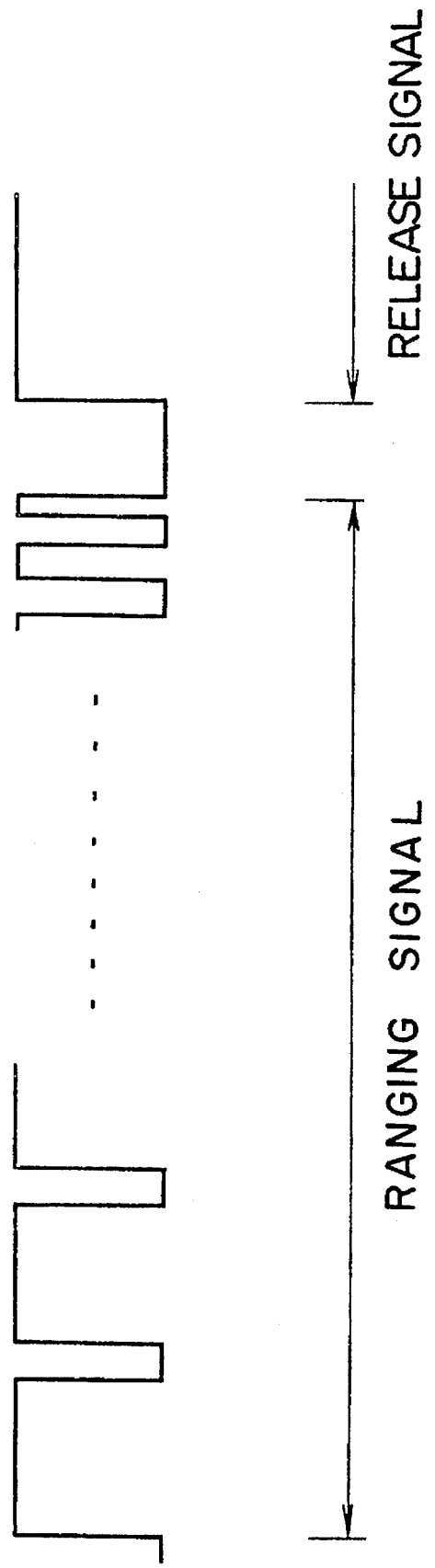
FIG. 4 is an explanatory drawing showing an example of a distance information signal.

The remote controller 20 has a transmitter 23 for projecting a remote control signal including a release signal and a ranging signal in a form of infrared beam, and a receiving circuit 24 for receiving the release signal and the ranging signal from the transmitter 23. The receiving circuit 24 is provided in the camera 21. The ranging signal is composed of multiple pulses with different pulse widths, as shown in FIG. 4. In this embodiment, a pulse number is 20 (pulses), and the pulse width varies from large to small. The release signal is projected after the ranging signal. Each pulse width of the ranging signal is set so that a pulse number received by the receiving circuit 24 decreases accordingly as the distance between the transmitter 23 and the receiving circuit 24 provided in the camera 21 extends. In this embodiment, each pulse width is set so that, under a field luminance LV (Light Value)=12, 20 pulses are received by the receiving circuit 24 when the distance between the transmitter 23 and the camera 21 is 1 m, 19 pulses when the distance is 1.5 m, 18 pulses at 2 m, 17 pulses at 3 m, 16 pulses at 4 m, 15 pulses at 5 m, 13 pulses at 6 m, 11 pulses at 7 m, 9 pulses at 8 m, 7 pulses at 9 m and 5 pulses at 10 m.

The camera 21 is equipped with a microcomputer 25. The microcomputer 25 controls a light measuring unit 26, a distance measuring unit 27, a focusing unit 28, a shutter control unit 29, a display 30 and a film feed unit 36. Further, the microcomputer 25 controls the writing and reading of an electrically rewritable non-volatile memory $E^2PROM$ 31. The light measuring unit 26 gives a luminance information of the field to the microcomputer 25. The distance measuring unit 27 gives a distance measurement information to the microcomputer 25. The focusing unit 28 brings out a taking lens 32 to a position where the focus is on, and returns it to the home position. The shutter control unit 29 opens/closes a shutter 33. The film feed unit 36 feeds a film. The display 30 displays a reception waiting and a reception of a signal from the transmitter 20 of the remote controller 20. A reference numeral 34 is a remote control mode request switch. The Remote control mode request switch 34 gives a remote control mode request signal to the microcomputer 25 when operated by a camera user. Further, the microcomputer 25 receives the ranging signal and the release signal from the receiving circuit 24 of the remote controller 20.

The microcomputer 25 stores said relationship of pulse numbers received under LV=12 and distance. That is, as described above, this relationship represents that the distance is 1 m when the number of received pulses is 20 pulses, 1.5 m for 19 pulses, 2 m for 18 pulses, 3 m for 17 pulses, 4 m for 16 pulses, 5 m for 15 pulses, 6 m for 13 pulses, 7 m for 11 pulses, 8 m for 9 pulses, 9 m for 7 pulses, and 10 m for 5 pulses.

The receiving circuit 24 is influenced by field luminance in the receiving of ranging signal. That is, when field luminance is higher than LV=15, the receiving circuit 24 is not able to receive pulses with short pulse widths, with certain distance as a border, and the number of receivable pulses decreases, compared with a case when field luminance is not high. Therefore, from the viewpoint of upgrading the accuracy of distance recognition, it is desirable to correct the pulse number of ranging signal received by the receiving circuit 24 for cases of high luminance.

The correction data writing device 22 is composed of a general-purpose computer, for example, and is connected freely via a terminal 35 of the camera to the microcomputer 25. By the correction data writing device 22, pulse numbers (N1, N2) representing the cases the number of received pulses is less compared with a case of LV=12 which is not a high luminance, namely cases requiring correction, and correction values representing how many pulses are to be added are written in the $E^2$PROM 31 of the camera 21. Pulse numbers (N1, N2) representing the cases requiring correction and correction values representing how many pulses are to be added are determined by measurement under high luminance conditions above LV=15. In this embodiment, a pulse number N1 representing a case requiring correction under LV=15 and a correction value, and a pulse number N2 representing a case requiring correction under LV=17 and a correction value are written into the $E^2$PROM 31. For example, if the same pulse numbers as those under LV=12 are obtained under LV=15 and up to 3 m of distance between the transmitter 23 and the camera 21, and if the pulse number is fewer by 1 pulse or 15 pulses are obtained at 4 m, compared with that under LV=12, a pulse number N1=15 representing a case requiring correction and +1 as a correction value are written into the $E^2$PROM 31. Also, if the same pulse numbers as those under LV=12 are obtained under LV=17 and up to 2 m of distance between the transmitter 23 and the camera 21, and if the pulse number is fewer by 3 pulses or 14 pulses are obtained at 3 m, compared with that under LV=12, a pulse number N2=14 representing a case requiring correction and +as a correction value are written into the $E^2$PROM 31. By finishing the writing of these, the correction data writing device 22 is detached from the camera 21. As described later, the pulse number N1 representing a case requiring correction under LV=15 and the correction value are used for cases the field luminance is 15≦LV≦16, and the pulse number N2 representing a case requiring correction under LV=17 and the correction value are used for cases the field luminance is LV>16.

Figure 5:
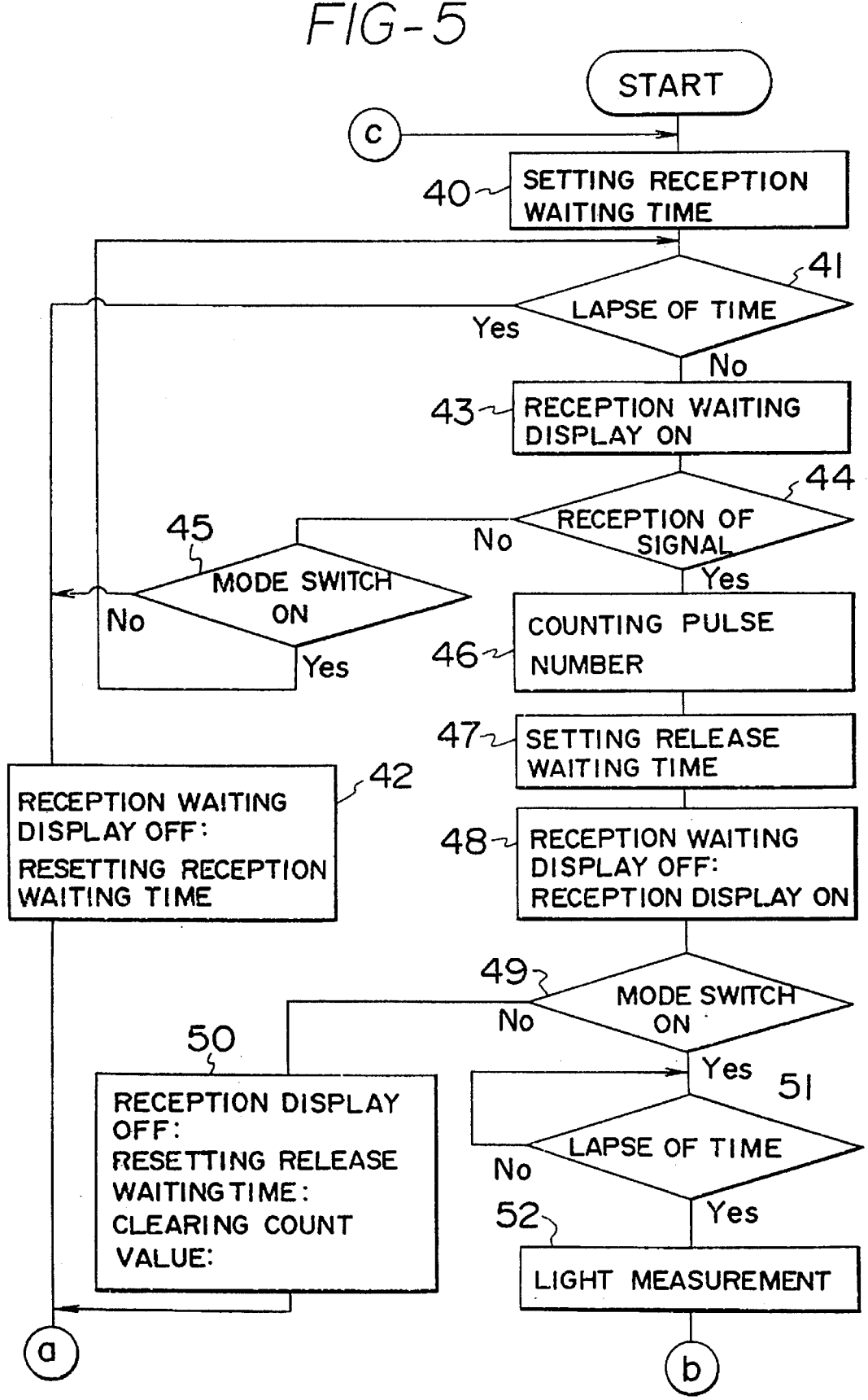
FIG. 5 and FIG. 6 are flow diagrams of a microcomputer of FIG. 3 and show a processing under a remote control mode.
Figure 6:
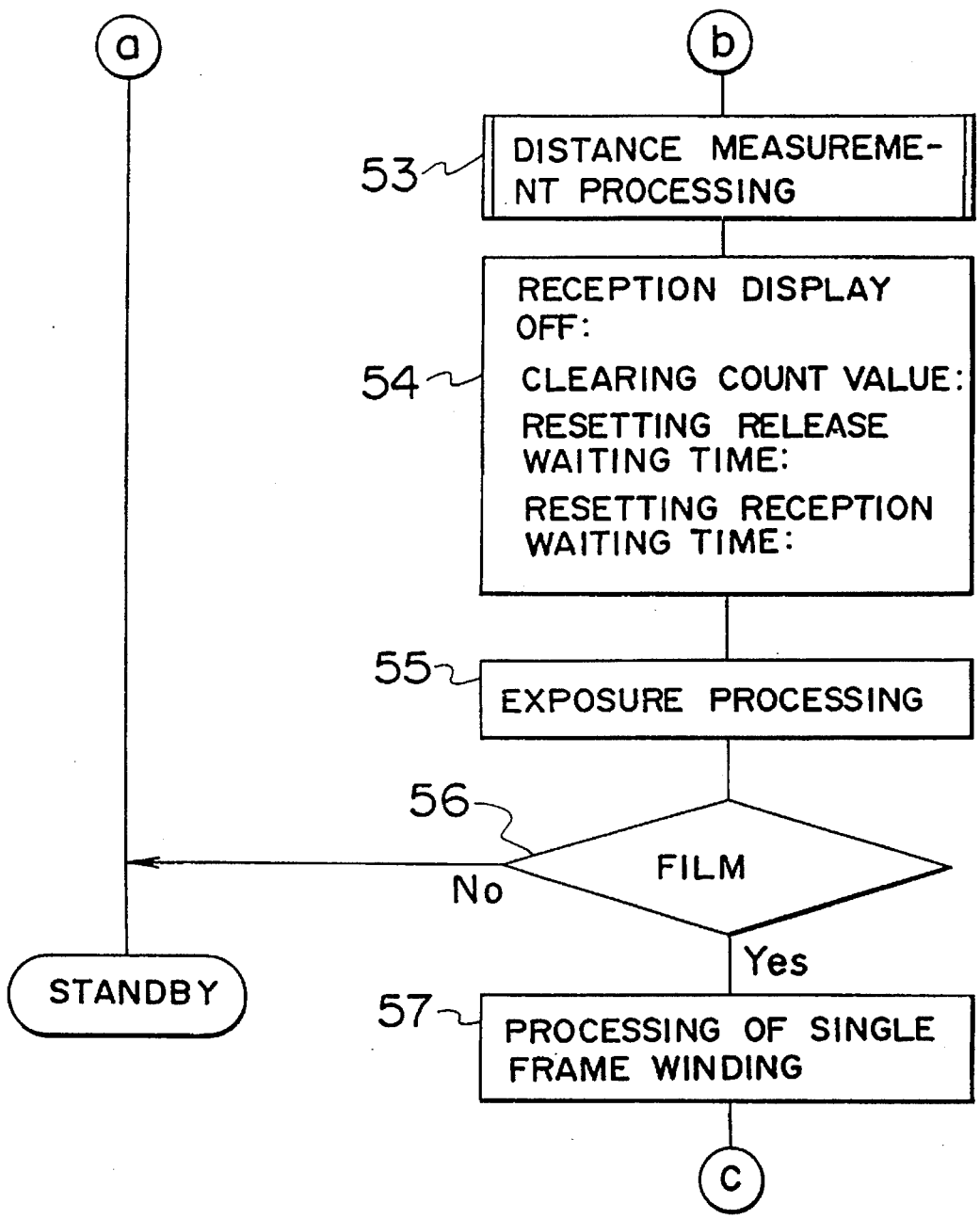

FIG. 5, FIG. 6 and FIG. 7 are the flow diagrams of the microcomputer 25 of FIG. 3. FIG. 5 and FIG. 6 show processings under a remote control mode. FIG. 7 shows the distance measurement processing in a step 53 of FIG. 6. Terminals a, b and c of FIG. 5 are connected to terminals with the same signs a, b and c of FIG. 6.

When the remote control mode request switch 34 is made on, the microcomputer 25 starts the processing of FIG. 5. The microcomputer 25 sets a reception waiting time for a signal from the transmitter 23 in a step 40, and judges whether or not the reception waiting time is passed in a following step 41. The reception waiting time is 2 minutes, for example. If the transmitter 23 is not operated within the reception waiting time, the microcomputer 25 after the lapse of the reception waiting time goes from step 41 to step 42, and through the putting off of a reception waiting display and the resetting of the reception waiting time in the step 42, goes to a standby status. By this, exhaustion of a battery is prevented. If the reception waiting time is not passed in the step 41, the microcomputer 25 goes from step 41 to step 43, and through the putting on of the reception waiting display on the display 30 in the step 43, judges whether or not a signal is received from the transmitter 23 in the step 44. If a signal from the transmitter 23 is not received, the microcomputer 25 goes from step 44 to step 45, and judges whether or not the remote control mode request switch 34 is on in the step 45. If the remote control mode request switch 34 is on, the microcomputer 25 returns to the step 41. If the remote control mode request switch 34 is off, the microcomputer 25 goes to the standby status through the step 42. When a signal from the transmitter 23 is received, the microcomputer 25 goes from step 44 to step 46, and counts the pulse number of the ranging signal received by the receiving circuit 24. After that, the microcomputer 25 sets a release waiting time in a step 47, puts off the reception waiting display of the display and puts on the reception display in a following step 48, and enters a step 49. The release time is 2 seconds, for example. The microcomputer 25 judges whether or not the remote control mode request switch 34 is on in the step 49. If the remote control mode request switch 34 is made off, the microcomputer 25 goes to the standby status, through the putting off of the reception display, the resetting of the release waiting time and the clearing of the count value of the distance information signal in a step 50. If the remote control mode request switch 34 is on, the microcomputer 25 starts waiting for the lapse of the release time in a step 51. When the release waiting time is passed, the microcomputer 25 gets a field luminance by driving the light measuring unit 26 in a step 52, and after that, starts an exposure processing of a step 55, through a distance measurement processing of a step 53, and the putting off of the reception display, the clearing of the count value of the ranging signal and the resetting of the reception waiting time of a step 54. In the exposure processing, the focusing unit 28 and the shutter control unit 29 are controlled based on the field luminance obtained in the step 52 and the distance obtained in the step 53, and a picturing is performed. After the exposure processing, the microcomputer 25 judges whether or not a film exists in a step 56. If no film exists, the microcomputer 25 goes to the standby status. If a film exists, the microcomputer 25 performs a single frame winding of the film by driving the film feed unit 36 in a step 57, and then returns to the step 40.

In the distance measurement processing of the step 53 of FIG. 6, a processing shown in FIG. 7 is performed. The microcomputer 25 judges whether or not the field luminance is LV≧15 in a step 60. If the field luminance is not LV≧15, the microcomputer 25 goes to a step 61, and reads out a distance corresponding to a pulse number of the received ranging signal from fixed data representing the relationship of pulse number and distance under LV=12, and finishes the distance measurement processing. If the field luminance is LV≧15, the microcomputer 25 goes from step 60 to step 62, and judges whether the field luminance is 15≦LV≦16. If the field luminance is 15≦LV≦16, the microcomputer 25 goes from step 62 to step 63, reads out a pulse number N1 representing a case requiring correction from the E$^2$PROM 31, and judges whether or not the pulse number of the ranging signal received by the receiving circuit 24 is≦N1 in a following step 64. If the received pulse number is not≦N1, the microcomputer 25 goes from step 64 to step 65, reads out a distance corresponding to the pulse number of the received ranging signal from fixed data representing the relationship of pulse number and distance under LV=12, and finishes the distance measurement processing. If the received pulse number is≦N1, the microcomputer 25, recognizing an influence of the field luminance, goes from step 64 to step 66, and reads out a correction value corresponding to LV=15 from the E$^2$PROM 31. In a following step 67, the microcomputer 25 corrects the correction value to the pulse number of the received distance information signal, reads out a distance corresponding to the corrected pulse number from fixed data representing the relationship of pulse number and distance under LV=12, and finishes the distance measurement processing. If the field luminance is not 15≦LV≦16 in the step 62, the microcomputer 25 goes from step 62 to step 68, reads out a pulse number N2 representing a case requiring correction from the E$^2$PROM 31, and judges whether or not the pulse number of the received ranging signal is≦N2 in a step 69 to follow. If the received pulse number is not≦N2, the microcomputer 25 goes from step 69 to step 65, reads out a distance corresponding to the received pulse number from fixed data representing the relationship of pulse number and distance under LV=12, and finishes the distance measurement processing. If the received pulse number is≦N2, the microcomputer 25, recognizing an influence of the field Luminance, goes from step 69 to step 70, and reads out a correction value corresponding to LV=17 from the E$^2$PROM 31. In a following step 71, the microcomputer 25 corrects the correction value to the pulse number of the received ranging signal, reads out a distance corresponding to the corrected pulse number from fixed data representing the relationship of pulse number and distance under LV=12, and finishes the distance measurement processing.

In the above-mentioned embodiment, in a case the field luminance is not LV≧15, a distance corresponding to the pulse number of the received ranging signal is read out from fixed data representing the relationship of pulse number and distance under LV=12 in the step 61 of FIG. 7. Instead, in a case the field luminance is not LV≧15, a normal distance measurement by the distance measuring unit 27 of the camera may be performed in the step 61 of FIG. 7.

As described above in detail, according to the preferred embodiment, a ranging signal, of which each pulse width is set so that the number of pulses received by the receiving circuit becomes fewer accordingly as the distance between the transmitter and the receiving circuit provided in the camera becomes larger, is projected with infrared beam from the transmitter, and the distance to the transmitter is recognized from the pulse number of the ranging signal received by the receiving circuit. Because of this, it is possible to prevent distance measurement errors in remote control shots under high luminance where the auto focusing function of the camera does not work satisfactorily or in remote control shots where the auto focusing function measures the distance of a background between right and left objects. Also, according to the preferred embodiment, in cases the ranging signal is influenced by the field luminance, the pulse number of the received ranging signal is corrected. Therefore, it is possible to get pictures as desired in remote control shots, without being affected by the field luminance.

From the foregoing it will now be apparent that a new and improved camera with infrared beam type remote controller has been found. It should be understood, of course, that the embodiments disclosed are merely illustrative and are not intended to limit the scope of the invention. Reference should be made to the appended claims, therefore, rather than the specification as indicating the scope of the invention.

What is claimed is:

1. A camera with an infrared beam type remote controller for performing a remote control shot comprising:

transmitting means, responsive to an external operation, for projecting an infrared remote control signal including at least one ranging signal composed of a sequence of pulses with different pulse widths;

receiving means for receiving said remote control signal including the at least one ranging signal from said transmitting means;

said ranging signal having pulse widths set so that the number of ranging signal pulses received by said receiving means becomes fewer accordingly as the distance between said transmitting means and said receiving means becomes larger;

memory means for storing a relationship between the pulse number, of said ranging signal which said receiving means receives, and distance;

distance recognizing means, responsive to said receiving means and said memory means, for counting the pulse number of that portion of said ranging signal which said receiving means actually received, and for reading a distance corresponding to a counted pulse number from said memory means, and for recognizing a distance between said transmitting means and the camera; and focusing means, responsive to said distance recognizing means, for bringing out a taking lens to a lens position corresponding to the distance recognized by said distance recognizing means.

2. The camera of claim 1 further comprising;

switching means, responsive to an external operation, for requesting the remote control shot; and standby means, responsive to said switching means and said receiving means, for making the camera assume a standby status after the lapse of a prescribed time in case no signal is given from said transmitting means within said prescribed time after the remote control shot is requested.

3. The camera of claim 2 further comprising display means, responsive to said switching means and said receiving means, for giving a display representing a reception waiting while a signal is not given from said transmitting means, and for giving a display representing a reception in place of the reception waiting when the signal is given from said transmitting means, after the remote control shot is requested.

4. A camera with an infrared beam type remote controller for performing a remote control shot comprising;

transmitting means, responsive to an external operation, for projecting an infrared remote control signal including at least one ranging signal composed of a sequence of pulses with different pulse widths;

receiving means for receiving said remote control signal including the at least one ranging signal from said transmitting means;

said ranging signal having pulse widths set so that the number of ranging signal pulses received by said receiving means becomes fewer accordingly as the distance between said transmitting means and said receiving means becomes larger;

memory means for storing a relationship between the pulse number, of said ranging signal which said receiving means receives, and distance;

an electrically rewritable non-volatile memory $E^2$PROM for storing the numbers of received pulses, representing cases requiring correction, of the ranging signal of said receiving means and correction values for the numbers of received pulses of said ranging signal of said receiving means, the numbers of received pulses, representing cases requiring correction, of the ranging signal of said receiving means and correction values for the numbers of received pulses of said ranging signal of said receiving means being set based on comparison between the numbers of received pulses, for distance under field conditions exceeding a prescribed high luminance, of said ranging signal of said receiving means and pulse numbers for distance of said memory means;

counting means, responsive to said receiving means, for counting the pulse number of that portion of said ranging signal which said receiving means actually received;

correcting means, responsive to said counting means and said $E^2$PROM, for giving a corrected pulse number by correcting a pulse number counted by said counting means, by means of said correction value, in a circumstance in which the field conditions exceeds said prescribed high luminance and the number of received pulses of said ranging signal of said receiving means is less than the number of received pulses representing a circumstance requiring correction, and for giving a pulse number counted by said counting means in other cases;

distance recognizing means, responsive to said correcting means and said memory means, for recognizing the distance between said transmitting means and the camera by reading a distance corresponding to a pulse number from said correcting means; and focusing means, responsive to said distance recognizing means, for bringing out the taking lens to a lens position corresponding to the distance recognized by said distance recognizing means.

5. The camera of claim 4, wherein the numbers of received pulses, representing cases requiring correction, of the ranging signal of said receiving means and the correction values for the numbers of received pulses of said ranging signal of said receiving means are determined by measuring the number of received pulses of said ranging signal of said receiving means for distance under field conditions exceeding said prescribed high luminance and based on comparison between these measured values and pulse numbers for distance of said memory means, and written externally into said $E^2$PROM.

6. The camera of claim 4 further comprising;

switching means, responsive to an external operation, for requesting the remote control shot; and standby means, responsive to said switching means and said receiving means, for making the camera assume a standby status after the lapse of a prescribed time in case no signal is given from said transmitting means within said prescribed time after the remote control shot is requested.

7. The camera of claim 6 further comprising display means, responsive to said switching means and said receiving means, for giving a display representing a reception waiting while a signal is not given from said transmitting means, and for giving a display representing a reception in place of the reception waiting when the signal is given from said transmitting means, after the remote control shot is requested.

8. A distance determination system for use in a camera having a remote control device, the system comprising:

a transmitter for transmitting an infrared remote control signal including at least one ranging signal composed of a sequence of pulses of different widths;

a receiver for receiving the remote control signal including the at least one ranging signal; and recognition means, responsive to the receiver, for determining actual distance from the transmitter to the receiver as a function of that portion of the ranging signal actually received.

9. A system according to claim 8, wherein:

each pulse of the ranging signal, after a first pulse, is changed in size relative to its preceding pulse, the sequence of pulses changing in size by one of progression and regression;

the system further comprising:

a counter, responsive to the receiver, for counting a pulse number, the pulse number being a number of pulses received of the ranging signal;

the recognition means determining actual distance as a function of the pulse number.

10. A system according to claim 9, further comprising:

a look-up table memory for storing at least one relation between pulse number and actual distance;

the recognition means determining actual distance by providing the pulse number to the look-up table memory and receiving therefrom an actual distance according to one of the at least one relation.

11. A system according to claim 10, wherein:

the at least one relation in the look-up table memory including a first relation in which the pulse number is inversely proportional to the actual distance.

12. A system according to claim 10, further comprising:

an ambient luminance sensor for sensing ambient luminance; and a comparator, responsive to the ambient luminance sensor, for comparing the ambient luminance against a reference level;

the look-up table memory storing at least a first and second relation between pulse number and actual distance;

the recognition means, also responsive to output from the comparator, determining actual distance as a function of the ranging signal and the comparator output.

13. A system according to claim 12, wherein:

when the comparator indicates that the ambient luminance is greater than the reference level, the recognition means operating upon the second relation; and when the comparator indicates that the ambient luminance is less than or equal to the reference level, the recognition means operating upon the first relation.

14. A system according to claim 8, further comprising:

an ambient luminance sensor for sensing ambient luminance;

a comparator, responsive to the ambient luminance sensor, for comparing the ambient luminance against a reference level;

the recognition means, also responsive to output from the comparator, determining actual distance as a function of the distance information signal and the comparator output.

15. A method for determining distance for use with a camera having a remote control device, the method comprising the steps of:

transmitting an infrared remote control signal including the at least one ranging signal composed of a sequence of pulses of different widths;

receiving the remote control signal including the at least one ranging signal; and determining actual distance from a point where the transmission occurred to a point where the reception occurred as a function of that portion of the ranging signal actually received.

16. A method according to claim 15, wherein:

each pulse of the ranging signal, after a first pulse, is changed in size relative to its preceding pulse, the sequence of pulses changing in size by one of progression and regression;

the method further comprising the step of:
counting a pulse number, the pulse number being a number of pulses received of the ranging signal;
the step of determining actual distance including determining a function of the pulse number.

17. A method according to claim 16, further comprising the step of:

storing at least one relation between pulse number and actual distance in a look-up table manner;

the step of determining including determining actual distance by retrieving from storage, according to one of the at least one relation, an actual distance in response to providing the pulse number.

18. A method according to claim 17, wherein:

the step of storing including storing a first relation in which the pulse number is inversely proportional to the actual distance.

19. A method according to claim 17, further comprising the step of:

sensing ambient luminance; and comparing the ambient luminance against a reference level;

the step of storing including storing at least a first and second relation between pulse number and actual distance;

the step of determining including determining actual distance as a function of the ranging signal and the comparator output.

20. A method according to claim 19, wherein:

when the comparison indicates that the ambient luminance is greater than the reference level, the step of determining operating upon the second relation; and when the comparison indicates that the ambient luminance is less than or equal to the reference level, the step of determining operating upon the first relation.

21. A method according to claim 15, further comprising the step of:

sensing ambient luminance;

comparing the ambient luminance against a reference level;

the step of determining including determining actual distance as a function of the distance information signal and the comparator output.

\* \* \* \* \*